(12) United States Patent
Lanza

(10) Patent No.: US 11,365,023 B1
(45) Date of Patent: Jun. 21, 2022

(54) COMBINED CONTAINER SPACING APPARATUS AND FOOD ADDITIVE HOLDER

(71) Applicant: Deborah Lanza, Nokomis, FL (US)

(72) Inventor: Deborah Lanza, Nokomis, FL (US)

(73) Assignee: Pizza Saver LLC, Nokomis, FL (US)

( * ) Notice: Subject to any disclaimer, the term of this patent is extended or adjusted under 35 U.S.C. 154(b) by 175 days.

(21) Appl. No.: 16/946,153

(22) Filed: Jun. 8, 2020

Related U.S. Application Data

(60) Provisional application No. 63/017,122, filed on Apr. 29, 2020, provisional application No. 62/858,641, filed on Jun. 7, 2019.

(51) Int. Cl.
| | |
|---|---|
| *B65D 85/30* | (2006.01) |
| *B65D 25/24* | (2006.01) |
| *B65D 85/36* | (2006.01) |
| *B65D 5/50* | (2006.01) |
| *B65D 81/36* | (2006.01) |
| *B65D 1/24* | (2006.01) |

(52) U.S. Cl.
CPC ............. *B65D 5/5028* (2013.01); *B65D 1/24* (2013.01); *B65D 25/24* (2013.01); *B65D 81/36* (2013.01); *B65D 85/30* (2013.01); *B65D 85/36* (2013.01); *B65D 2585/366* (2013.01)

(58) Field of Classification Search
CPC B65D 25/02; B65D 2501/24834; B65D 5/44; B65D 5/441; B65D 5/445; B65D 5/5028; B65D 1/24; B65D 81/36; B65D 85/30; B65D 85/36; A47G 19/24; A47J 47/02
See application file for complete search history.

(56) References Cited

U.S. PATENT DOCUMENTS

| | | | |
|---|---|---|---|
| 4,498,586 A | 2/1985 | Vitale | |
| 5,077,050 A | 12/1991 | Wall | |
| 7,222,778 B2 * | 5/2007 | Smith | ................. B65D 5/5028 229/199 |
| 2003/0024843 A1 | 2/2003 | dePoortere | |
| 2016/0213180 A1 | 7/2016 | Javaruski | |

* cited by examiner

*Primary Examiner* — Andrew T Kirsch
(74) *Attorney, Agent, or Firm* — Smith & Hopen, P.A.; Paul Murty

(57) ABSTRACT

A combined container spacing apparatus and spice holder, includes a plurality of elongated leg components that space a lid portion of the apparatus away from the bottom of the legs, thereby spacing the additives away from the food stored within the larger container. As such, the lid portion does not contact the food, thereby preventing contamination of the food stored within the apparatus. In addition, the apparatus includes a plurality of independent holders disposed therein, with each holder being spaced apart from the other holders of the apparatus. As such, there is no risk of leakage between the holders, such that the spices, toppings, and sauces remain entirely separate within the apparatus. As such, the combined apparatus is usable not only as a spacing component to maintain food quality during transportation, but also as an additive holder to allow customization and enhancements of the food upon arrival at a destination.

20 Claims, 4 Drawing Sheets

COMBINED CONTAINER SPACING APPARATUS AND FOOD ADDITIVE HOLDER

CROSS-REFERENCE TO RELATED APPLICATIONS

This nonprovisional application is a continuation of and claims priority to provisional application No. 62/858,641, entitled "Spice shaker pizza saver," filed Jun. 7, 2019 by the same inventor, and to provisional application No. 63/017,122, filed Apr. 29, 2020 by the same inventor, entitled "Spice shaker pizza saver," the entireties of which are incorporated herein by reference.

BACKGROUND OF THE INVENTION

1. Field of the Invention

This invention relates, generally, to a combined apparatus used as a spacer within a container and as a container itself. More specifically, it relates to a combined container spacing apparatus and food additive holder, used to both prevent contact between opposing surfaces of a flexible container, as well as contain spices therein. In particular, this invention relates to a combined apparatus usable within a pizza transportation container, used to prevent contact between the container and the pizza disposed therein, as well as to contain condiments, spices, and other toppings typically applied to a pizza prior to consumption.

2. Brief Description of the Prior Art

With the fast pace of modern life, restaurants typically offer a take-out or to-go option for meals prepared for sale. Some restaurants also provide delivery services, and independent delivery companies have become more common with improvements in technology during the 21$^{st}$ century. For a consumer, having the option to eat restaurant-quality food from another location, such as a home, a dormitory, a hotel, a public park, and other locations, presents advantages of being able to multitask while eating, as well as providing the opportunity to easily provide food for a plurality of guests without the hassle of going to a restaurant. However, it is essential to maintain the quality of food transported from a restaurant to a home, so that the consumer has the same experience eating at home that the consumer would have while eating at the restaurant.

One of the most commonly delivered food item is a pizza pie, which can be easily shared among a group of people upon arrival to a house. Due to the large circular shape of the pizza pie, as well as the thin nature of the pizza from top surface to bottom surface, a specialized container must be used to transport the pizza from restaurant to home. However, to maintain the low costs typically associated with pizza pies, the specialized container must be low in cost as well. As such, the common pizza holder is an inexpensive and disposable cardboard box or carton that includes a width and a height greater than an associated diameter and height of the pizza disposed therein.

However, the inexpensive nature of the box, in addition to the high temperatures associated with the pizza contained within the box, leads to the potential contact between the inner top surface of the box and the top surface of the pizza. As such, a delivered pizza can be damaged or contaminated by contacting the box, which is prone to sagging toward the pizza. In addition, such contact results in grease transfer to the pizza box, thereby removing the ability to recycle the cardboard pizza box, leading to waste. Attempts have been made to maintain a space between the pizza and the pizza box, such as that of U.S. Pat. No. 4,498,586.

While the problem of preventing contact between the pizza and the pizza box has largely been solved, another problem exists with delivered or take-out food, particularly pizza pies. Often, meals from restaurants do not include optional spices, toppings, or sauces disposed on the food within a container. This is in part due to the fact that such spices, toppings, and sauces are optional and individual consumer tastes vary, such that some consumers will apply the optional additives, while others will not. In addition, the amount of additives added to the food varies between consumers. Moreover, restaurants often do not add the optional spices, toppings, and sauces to food prior to delivery because the additives have diminished tastes associated therewith if not applied immediately preceding consumptions. As such, restaurants typically include separate containers within the larger food container to transport optional spices, toppings, and sauces to the consumer. The inclusion of separate containers within the larger container is not ideal, since the separate containers result in increased costs for the restaurant, and are typically loosely stored within the container, potentially resulting in contact between the food and the separate containers, which can contaminate the stored food.

Particularly with respect to pizza pies, consumers often enhance the toppings of the pizza immediately prior to consumption by applying oregano, garlic powder, liquid garlic butter, crushed red peppers, parmesan cheese, and/or other additives. These additives typically arrive from the restaurant in disposable holders within the pizza box, separate from the pizza saver spacer device that maintains a space between the pizza and the pizza box. The results of the separate components are greater costs incurred by the restaurant, a greater carbon footprint, and the potential for contamination of the pizza by the additive containers. Moreover, the consumer receives packages with little opportunity to interact with the packages; instead, the packages are separate and separately labeled, leading to few customization options.

Attempts have been made to combine a spacing device with additive containers. For example, U.S. Pat. No. 5,077,050 teaches a condiment container used to support the lid of a cardboard box, which also contains at least one compartment. However, the condiment container is kettle-shaped, including a vast volume, with a bottom surface that risks contact with the top surface of a pizza pie. In addition, the '050 Patent contemplates a multi-container embodiment of the condiment container; however, the containers share side walls with one another, as opposed to being separated by a distance such as to be independent containers. As a result, a user faces increased chances of inadvertently applying more than one additive, when only a singular additive is desired to be applied to the top surface of a pizza. Moreover, the shared side walls risk leakage between adjoining containers within the condiment container, which would result in a user applying mixtures of additives that may not be desired. Similar problems are faced by U.S. Publication No. 20160213180 and U.S. Publication No. 20030024843.

Accordingly, what is needed is a combined apparatus used as a spacer within a container and as a container itself, including a plurality of independent individual holders therein with spaces therebetween, and with a holding-portion height much smaller than a height of the larger container itself, such that the holding-portion of the apparatus does not contact a surface of the food stored within the larger container, and such that multiple food additive condiments are immediately available for use by a consumer. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a combined container spacing apparatus and spice holder is now met by a new, useful, and nonobvious invention.

The novel structure includes a base including a top surface opposite a bottom surface. The top surface is joined to the bottom surface via a circumferential side wall. The top surface of the base also includes a plurality of circumferentially-disposed, spaced-apart, independent projections extending in a direction away from the top surface of the base. Each projection includes a circumferential side wall and a bottom surface, such that each projection defines a holder aperture therein, and such that each holder aperture disposed to receive a food additive therein. An extension is centrally-disposed on the top surface of the base. The extension is equally spaced apart from each of the independent projections, and the extension projects outwardly from the top surface in a direction away from the bottom surface.

A lid is secured to the base, the lid including a top surface opposite a bottom surface, with a centrally-disposed receipt formed within the bottom surface. The centrally-disposed receipt is sized and shaped to surmount the centrally-disposed extension of the top surface of the base, such that a press fit forms between the lid and the base. A plurality of projections extend away from the bottom surface of the lid. Each of the plurality of projections includes a diameter that is greater than a diameter of each of the plurality of projections of the bottom surface, such that a press fit forms between each of the plurality of projections of the lid and each of the plurality of projections of the base. As such, the combined container spacing apparatus and spice holder is configured to include a plurality of independent food additives stored therein without intermixing between each of the plurality of independent food additives. In an embodiment, the apparatus includes four of each of the plurality of projections of the base and the plurality of projections of the lid, with the four components being equally, circumferentially distributed about each of the base and the lid, such that the respective projections are aligned when the lid secures to the base.

In an embodiment, the lid includes a plurality of sections each hingedly secured to the centrally-disposed receipt. Each section extends from the centrally-disposed receipt to a discontinuous side wall of the lid, such that each of the plurality of sections forms a quadrant of the lid. In an embodiment, each of the plurality of sections is spaced apart from adjacent ones of the plurality of sections by a space. In an embodiment, the top surface of the lid, including each of the plurality of sections, extends beyond the bottom surface of the lid, thereby forming a flange that is configured to be gripped to lift the lid in a direction away from the base. In an embodiment, a scannable indicia is disposed on a top surface of at least one of the plurality of sections. The scannable indicia includes a link to a webpage, wherein the scannable indicia is configured, when scanned, to transmit the link to the webpage to an electronic device, such that the webpage is displayed on the electronic device.

The combined apparatus also includes a plurality of brackets circumferentially disposed about the base, with each of the plurality of brackets extending laterally away from the circumferential side wall in a direction away from the base. A plurality of elongated legs are receivable within one of the plurality of brackets, such that a bottom surface of each of the plurality of elongated legs is configured to rest on a surface of a container to create a space between the base and the surface of the container. As such, the combined container spacing apparatus and spice holder is configured to be spaced apart from the surface of the container via the plurality of legs, such that the bottom surface of the base does not contact food stored within the container. In an embodiment, a length of each of the plurality of elongated legs is more than double a height of the side wall of the base, such that the bottom surface of the base is spaced apart from the bottom surface of each of the plurality of legs. In an embodiment, the apparatus includes three of each of the plurality of brackets and the plurality of legs, with the three components being equally, circumferentially distributed about the base.

An object of the invention is to provide a combined container spacing apparatus and spice holder including a plurality of independent, spaced-apart holders to hold varying spices, toppings, and sauces, to accomplish the dual goals of preventing contact between a larger container and food stored therein, as well as provide a mechanism through which a user can modify the food via additives independently stored within the holders, without leakage between adjacent holders.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a combined container spacing apparatus and spice holder, particularly used in combination with a take-out food container to both prevent contact between the food and the container, as well as house food additives therein. The combined apparatus includes a plurality of elongated leg components that space the lid portion of the apparatus away from the bottom of the legs, thereby spacing the additives away from the food stored within the larger container. As such, the lid portion does not contact the food, thereby preventing contamination of the food stored within the apparatus. In addition, the apparatus includes a plurality of independent holders disposed therein, with each holder being spaced apart from the other holders of the apparatus. As such, there is no risk of leakage between the holders, such that the spices, toppings, and sauces remain entirely separate within the apparatus. As a result, the combined apparatus is usable not only as a spacing component to maintain food quality during transportation, but also as an additive holder to allow customization and enhancements of the food upon arrival at a destination.

Figure 1B:
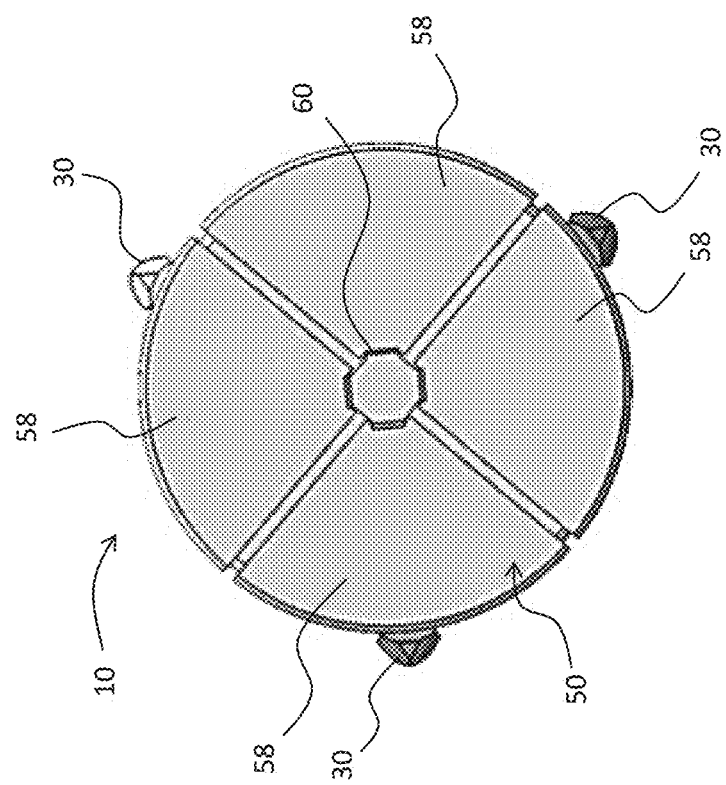
FIG. 1B is a top plan view of the combined container spacing apparatus and spice holder of FIG. 1A.
Figure 1A:
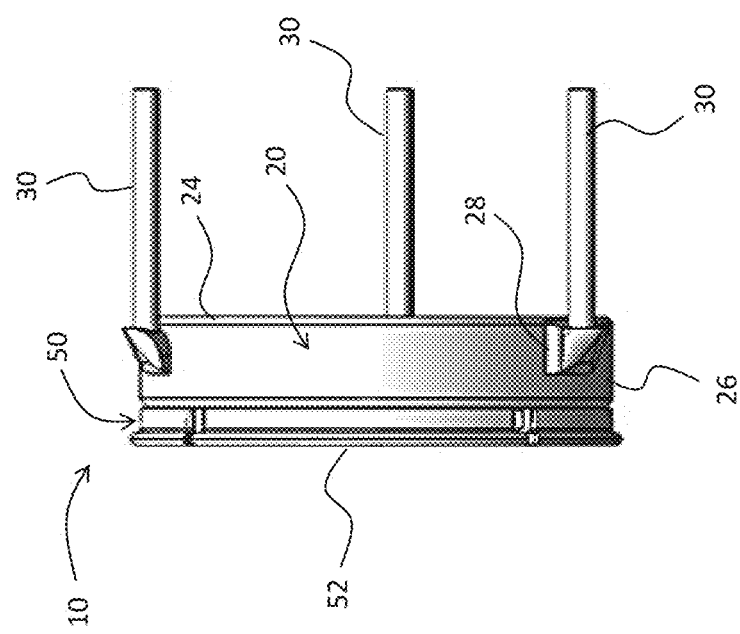
FIG. 1A is a side orthogonal view of a combined container spacing apparatus and spice holder.

As shown in FIGS. 1A-1B, combined container spacing apparatus and spice holder 10 (also referred to as combined apparatus 10) includes base 20 and lid 50. Lid 50 is secured to base 20 via central receipt 60, the top portion of which is shown in FIG. 1B as forming a portion of top surface 52 of lid 50. Base 20 includes bottom surface 24 secured to top surface 22 via side wall 26, which is shown as a circumferential side wall in FIGS. 1A-1B (base 20 is shown in greater detail in FIGS. 2A-2B, described below). A plurality of brackets 28 extend outwardly from base 20 in a direction away from side wall 26, with each of the plurality of brackets 28 including a space between opposing walls to receive one of a plurality of legs 30. Legs 30 are received within brackets 28 and extend perpendicularly away from base 20 and lid 50, terminating such that legs 30 are designed to rest on a surface, such as the surface of a container or the top surface of a pizza pie.

In addition, as shown in particular in FIG. 1B, lid 50 includes a plurality of spaced apart sections 58 hingedly coupled to the top portion of central receipt 60. Each of sections 58 form a quadrant of the circular shape of lid 50, extending away from central receipt 60 to form a circumference of lid 50. A top surface 52 of each section 58 is disposed to include a font or graphic thereon, such as an advertising logo for a particular restaurant, a sponsorship logo, a description of an additive stored within the particular section 58, a scannable indicia (such as a matrix barcode or other barcode), or other outward consumer-facing graphic. For example, in an embodiment, top surface 52 of at least one section 58 includes a scannable indicia including a link to a webpage associated with the restaurant, such that a user can scan the indicia via a smartphone to load the restaurant's webpage. In an embodiment, the scannable indicia is usable to extract live data from a consumer, such as survey results, coupon offers, reward point tallies, interactive gaming components, prize-based competitions, and other live data useful to a company or a marketing/advertising firm. Moreover, in an embodiment, lid 50 includes a scannable indicia through which a delivery driver confirms final delivery of a pizza pie to a final destination to provide data-based feedback for the delivery. Lid 50 is shown in greater detail in FIGS. 3A-3C, described below.

Figure 2B:
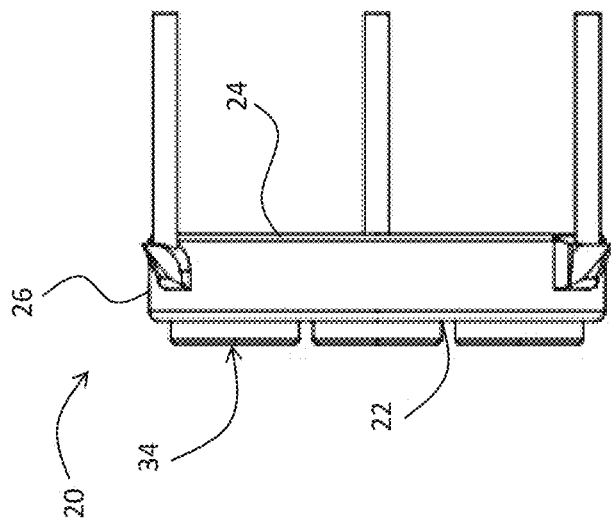
FIG. 2B is a side orthogonal view of the base component of FIG. 2A.
Figure 2A:
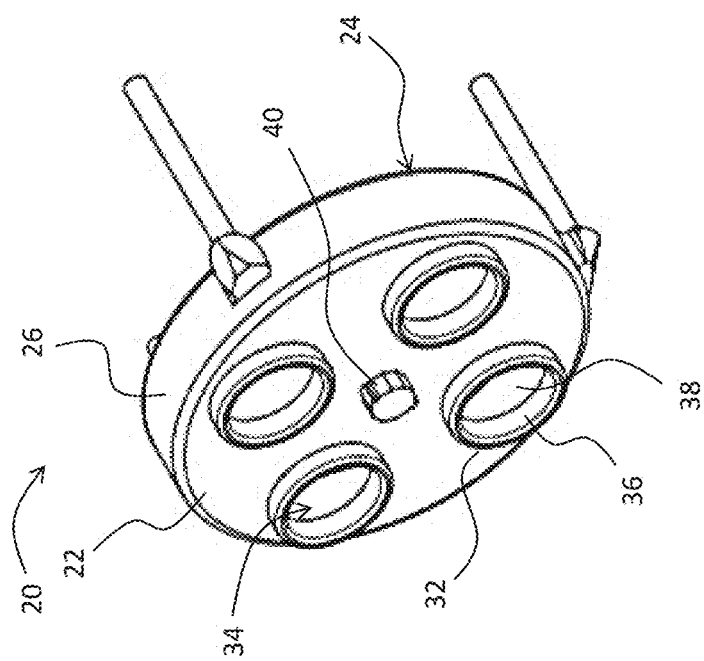
FIG. 2A is a perspective view of a base component of the combined container spacing apparatus and spice holder of FIG. 1A.

As shown in greater detail in FIGS. 2A-2B, base 20 includes top surface 22 opposite bottom surface 24, with side wall 26 joining top surface 22 to bottom surface 24. The height of base 20 (i.e., the distance between bottom surface 24 and top surface 22) is less than approximately 15 mm. In addition, as described above, a plurality of brackets 28 extend outwardly from side wall 26 in a direction away from base 20, with each bracket 28 disposed to receive and retain one of a plurality of legs 30 therein. Each leg 30 is approximately 24 mm in length. As such, base 20 is spaced apart from a bottom surface of each leg 30, such that base 20 is spaced apart from a food substance stored within a container within which leg 30 resides, thereby spacing base 20 apart from the stored food.

In addition, top surface 22 of base 20 includes a plurality of circumferentially-distributed projections 32 that extend away from top surface 22 in a direction away from base 20. Each projection 32 includes a continuous, circumferential side wall 36 that connects a top end of projection 32 with a holding surface 38 thereof. In an embodiment, holding surface 38 is disposed between top surface 22 and bottom surface 24 of base 20, such that holding surface 38 forms a depression within top surface 22 to increase a holding volume thereof; however, it should be appreciated that holding surface 38 can be level with top surface 22, so long as holding surface 38 and side wall 36 form a container having a volume within which additives can be stored. The containing portion of each projection 32 is referred to as aperture 34, within which an additive is stored. Base 20 includes a separate central extension 40 equally spaced apart from each of projections 32. Central extension 40 projects from top surface 22 in a direction away from base 20, and central extension 40 forms a first component of an attachment mechanism between base 20 and lid 50 (the second component of the attachment mechanism is central receipt 60, described below in greater detail).

Figure 3B:
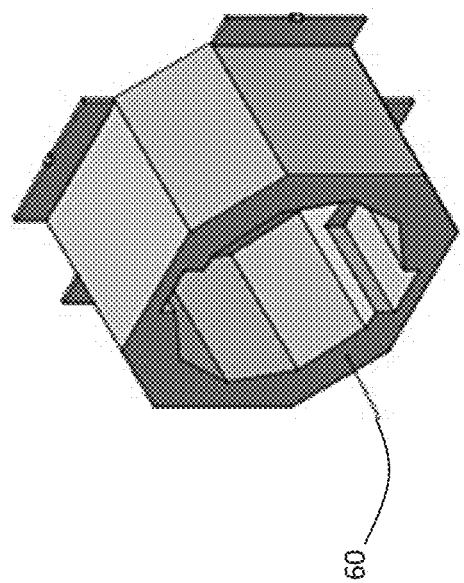
FIG. 3B is a close-up perspective view of a central receipt of the lid component of FIG. 3A, which connects the lid component to the base component shown in FIG. 2A.
Figure 3A:
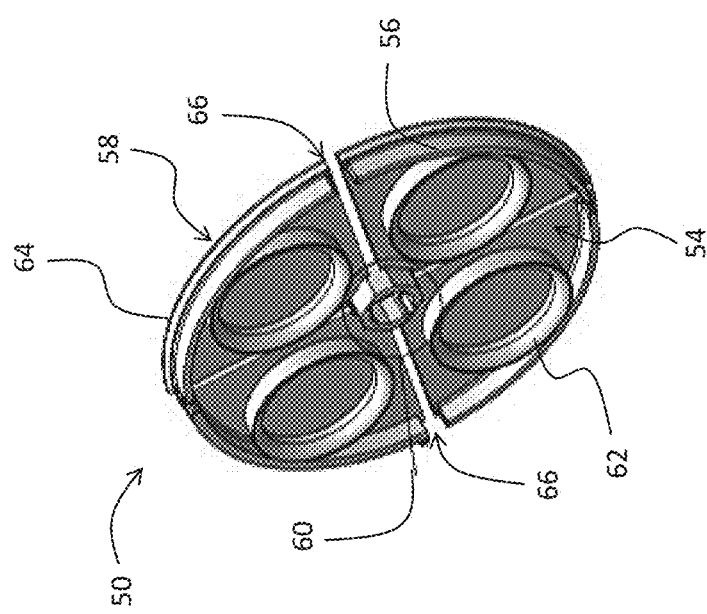
FIG. 3A is a perspective view of a lid component of the combined container spacing apparatus and spice holder of FIG. 1A.
Figure 3C:
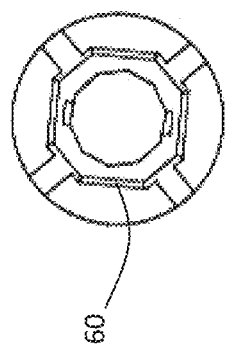
FIG. 3C is a close-up perspective view of an alternative embodiment of the central receipt of the lid component of FIG. 3A.

FIGS. 3A-3C depict embodiments of lid 50 in greater detail. As shown in FIG. 3A, lid 50 includes bottom surface 54 that opposes top surface 52, shown in detail in FIGS. 1A-1B. Lid 50 also includes a discontinuous, circumferential side wall 56 that joins top surface 52 to bottom surface 54. Top surface 54 extends beyond side wall 56 via flange 64 on each of sections 58 of lid 50; flange 64 is configured to function as a gripping surface for a user to open individual sections 58 of lid 50. As noted above, circumferential side wall 56 is discontinuous, with spaces 66 existing between adjacent sections 58 of lid 50. As such, adjacent sections 58 are not in contact with each other, preventing contamination between adjacent sections 58.

Lid 50 secures to base 20 via a connection between central receipt 60 of lid 50 and central extension 40 of base 20. Central receipt 60 is sized such that a diameter thereof is slightly greater than a diameter of central extension 40 of base 20, such that central receipt 60 surmounts central extension 40 to form a press fit therewith, thereby securing lid 50 to base 20 in the absence of a pulling force. FIG. 3B includes a depiction of an embodiment of central receipt 60 including offset symmetrical connections surfaces defining the receipt portion; FIG. 3C includes a depiction of an embodiment of central receipt 60 including identical, symmetrical connection surfaces defining the receipt portion. So long as the internal side walls defining central receipt 60 match the outer side walls of central extension 40, it should be understood that the orientation and shape of the walls can vary.

In addition, each section 58 includes a projection 62 extending from bottom surface 54 in a direction away from lid 50. Each projection 62 includes a diameter that is slightly greater than a diameter of each projection 32 of base 20, such that the projections 62 of lid 50 are sized and shaped to form a press fit with each projection 32 of base 20, with the projections 62 of lid 50 surmounting and enclosing each projection 32 of base 20. As such, any additive stored within the apertures 34 defined by projections 32 remains enclosed between projection 32 and projection 62, without the risk of leakage from an individual projection 32. The prevention of leakage is especially important in the case of a liquid-based additive stored within projection, as such an additive would mix with other additives or prematurely mix with food within a larger container in the absence of an independent holder. As such, each projection 62 can store at least one additive therein, such as oregano, garlic powder, liquid garlic butter, crushed red peppers, parmesan cheese, and/or other additives. Moreover, the separation between adjacent sections 58 and thereby between different holding surfaces 38 allows for different food additives to be added to a food item at the same time by a consumer. For example, two different sections 58 can be hingedly opened to allow a consumer to simultaneously apply both food additives to a pizza. In an embodiment in which four sections 58 are present, the remaining two sections 58 remain closed, such that their contents remain contained within combined apparatus 10.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A combined container spacing apparatus and spice holder comprising:
    a base including a top surface opposite a bottom surface, the top surface joined to the bottom surface via a circumferential side wall, the top surface of the base including a plurality of circumferentially-disposed, spaced-apart, independent projections extending in a direction away from the top surface of the base, each projection including a circumferential side wall and a bottom surface, such that each projection defines a holder aperture therein, each holder aperture disposed to receive a food additive therein;
    a plurality of brackets circumferentially disposed about the base, each of the plurality of brackets extending laterally away from the circumferential side wall in a direction away from the base;
    a plurality of elongated legs, each of the plurality of elongated legs receivable within one of the plurality of brackets, such that a bottom surface of each of the plurality of elongated legs is configured to rest on a surface of a container to create a space between the base and the surface of the container;
    an extension centrally-disposed on the top surface of the base, the extension equally spaced apart from each of the independent projections, the extension projecting outwardly from the top surface in a direction away from the bottom surface;
    a lid secured to the base, the lid including a top surface opposite a bottom surface, with a centrally-disposed receipt formed within the bottom surface, the centrally-disposed receipt sized and shaped to surmount the centrally-disposed extension of the top surface of the base, such that a press fit forms between the lid and the base; and
    a plurality of projections extending away from the bottom surface of the lid, each of the plurality of projections including a diameter that is greater than a diameter of each of the plurality of projections of the base, such that a press fit forms between each of the plurality of projections of the lid and each of the plurality of projections of the base,
    wherein the combined container spacing apparatus and spice holder is configured to be spaced apart from the surface of the container via the plurality of legs, such that the bottom surface of the base does not contact food stored within the container, and
    wherein the combined container spacing apparatus and spice holder is configured to include a plurality of independent food additives stored therein without intermixing between each of the plurality of independent food additives.

2. The apparatus of claim 1, wherein the lid includes a plurality of sections each hingedly secured to the centrally-disposed receipt.

3. The apparatus of claim 2, wherein each of the plurality of sections extends from the centrally-disposed receipt to a discontinuous side wall of the lid, each of the plurality of sections forming a quadrant of the lid.

4. The apparatus of claim 3, wherein each of the plurality of sections is spaced apart from adjacent ones of the plurality of sections by a space.

5. The apparatus of claim 1, wherein the top surface of the lid extends beyond the bottom surface of the lid, thereby forming a flange that is configured to be gripped to lift the lid in a direction away from the base.

6. The apparatus of claim 1, wherein a length of each of the plurality of elongated legs is more than double a height of the side wall of the base, such that the bottom surface of the base is spaced apart from the bottom surface of each of the plurality of legs.

7. The apparatus of claim 1, wherein the plurality of brackets and the plurality of elongated legs each include three components that are equally, circumferentially distributed about the base.

8. The apparatus of claim 1, wherein the plurality of projections of the base and the plurality of projections of the lid each include four components that are equally, circumferentially distributed about each of the base and the lid, such that the respective projections are aligned when the lid secures to the base.

9. A combined container spacing apparatus and additive holder comprising:
a base including a top surface opposite a bottom surface, the top surface joined to the bottom surface via a circumferential side wall, the top surface of the base including a plurality of circumferentially-disposed, spaced-apart, independent projections extending in a direction away from the top surface of the base, each projection including a circumferential side wall and a bottom surface, such that each projection defines a holder aperture therein, each holder aperture disposed to receive a food additive therein;
a plurality of brackets circumferentially disposed about the base, each of the plurality of brackets extending laterally away from the circumferential side wall in a direction away from the base;
a plurality of elongated legs, each of the plurality of elongated legs receivable within one of the plurality of brackets, such that a bottom surface of each of the plurality of elongated legs is configured to rest on a surface of a container to create a space between the base and the surface of the container;
an extension centrally-disposed on the top surface of the base, the extension equally spaced apart from each of the independent projections, the extension projecting outwardly from the top surface in a direction away from the bottom surface;
a lid secured to the base, the lid including a top surface opposite a bottom surface, with a centrally-disposed receipt formed within the bottom surface, the centrally-disposed receipt sized and shaped to surmount the centrally-disposed extension of the top surface of the base, such that a press fit forms between the lid and the base:
the lid including a plurality of sections each hingedly secured to the centrally-disposed receipt, each of the plurality of sections extending from the centrally-disposed receipt to a discontinuous side wall of the lid, each of the plurality of sections forming a quadrant of the lid; and
a plurality of projections extending away from the bottom surface of the lid, each of the plurality of projections including a diameter that is greater than a diameter of each of the plurality of projections of the base, such that a press fit forms between each of the plurality of projections of the lid and each of the plurality of projections of the base,
wherein the combined container spacing apparatus and spice holder is configured to be spaced apart from the surface of the container via the plurality of legs, such that the bottom surface of the base does not contact food stored within the container, and
wherein the combined container spacing apparatus and spice holder is configured to include a plurality of independent food additives stored therein without intermixing between each of the plurality of independent food additives.

10. The apparatus of claim 9, wherein each of the plurality of sections is spaced apart from adjacent ones of the plurality of sections by a space.

11. The apparatus of claim 9, wherein the top surface of the lid extends beyond the bottom surface of the lid, thereby forming a flange that is configured to be gripped to lift the lid in a direction away from the base.

12. The apparatus of claim 9, wherein a length of each of the plurality of elongated legs is more than double a height of the side wall of the base, such that the bottom surface of the base is spaced apart from the bottom surface of each of the plurality of legs.

13. The apparatus of claim 9, wherein the plurality of brackets and the plurality of elongated legs each include three components that are equally, circumferentially distributed about the base.

14. The apparatus of claim 9, wherein the plurality of projections of the base and the plurality of projections of the lid each include four components that are equally, circumferentially distributed about each of the base and the lid, such that the respective projections are aligned when the lid secures to the base.

15. A combined spacing apparatus and additive holder comprising:
a base including a top surface opposite a bottom surface, the top surface joined to the bottom surface via a circumferential side wall, the top surface of the base including a plurality of circumferentially-disposed, spaced-apart, independent projections extending in a direction away from the top surface of the base, each projection including a circumferential side wall and a bottom surface, such that each projection defines a holder aperture therein, each holder aperture disposed to receive a food additive therein;
a plurality of brackets circumferentially disposed about the base, each of the plurality of brackets extending laterally away from the circumferential side wall in a direction away from the base;
a plurality of elongated legs, each of the plurality of elongated legs receivable within one of the plurality of brackets, such that a bottom surface of each of the plurality of elongated legs is configured to rest on a surface of a container to create a space between the base and the surface of the container;
an extension centrally-disposed on the top surface of the base, the extension equally spaced apart from each of the independent projections, the extension projecting outwardly from the top surface in a direction away from the bottom surface;
a lid secured to the base, the lid including a top surface opposite a bottom surface, with a centrally-disposed receipt formed within the bottom surface, the centrally-disposed receipt sized and shaped to surmount the centrally-disposed extension of the top surface of the base, such that a press fit forms between the lid and the base;

the lid including a plurality of sections each hingedly secured to the centrally-disposed receipt, each of the plurality of sections extending from the centrally-disposed receipt to a discontinuous side wall of the lid, each of the plurality of sections forming a quadrant of the lid, and each of the plurality of sections being spaced apart from adjacent ones of the plurality of sections by a space; and a plurality of projections extending away from the bottom surface of the lid, each of the plurality of projections including a diameter that is greater than a diameter of each of the plurality of projections of the base, such that a press fit forms between each of the plurality of projections of the lid and each of the plurality of projections of the base, wherein the combined container spacing apparatus and spice holder is configured to be spaced apart from the surface of the container via the plurality of legs, such that the bottom surface of the base does not contact food stored within the container, and wherein the combined container spacing apparatus and spice holder is configured to include a plurality of independent food additives stored therein without intermixing between each of the plurality of independent food additives.

16. The apparatus of claim 15, wherein the top surface of the lid extends beyond the bottom surface of the lid, thereby forming a flange that is configured to be gripped to lift the lid in a direction away from the base.

17. The apparatus of claim 15, wherein a length of each of the plurality of elongated legs is more than double a height of the side wall of the base, such that the bottom surface of the base is spaced apart from the bottom surface of each of the plurality of legs.

18. The apparatus of claim 15, wherein the plurality of brackets and the plurality of elongated legs each include three components that are equally, circumferentially distributed about the base.

19. The apparatus of claim 15, wherein the plurality of projections of the base and the plurality of projections of the lid each include four components that are equally, circumferentially distributed about each of the base and the lid, such that the respective projections are aligned when the lid secures to the base.

20. The apparatus of claim 15, further comprising a scannable indicia disposed on a top surface of at least one of the plurality of sections, the scannable indicia including a link to a webpage, wherein the scannable indicia is configured, when scanned, to transmit the link to the webpage to an electronic device, such that the webpage is displayed on the electronic device.

* * * * *